Figure 1:
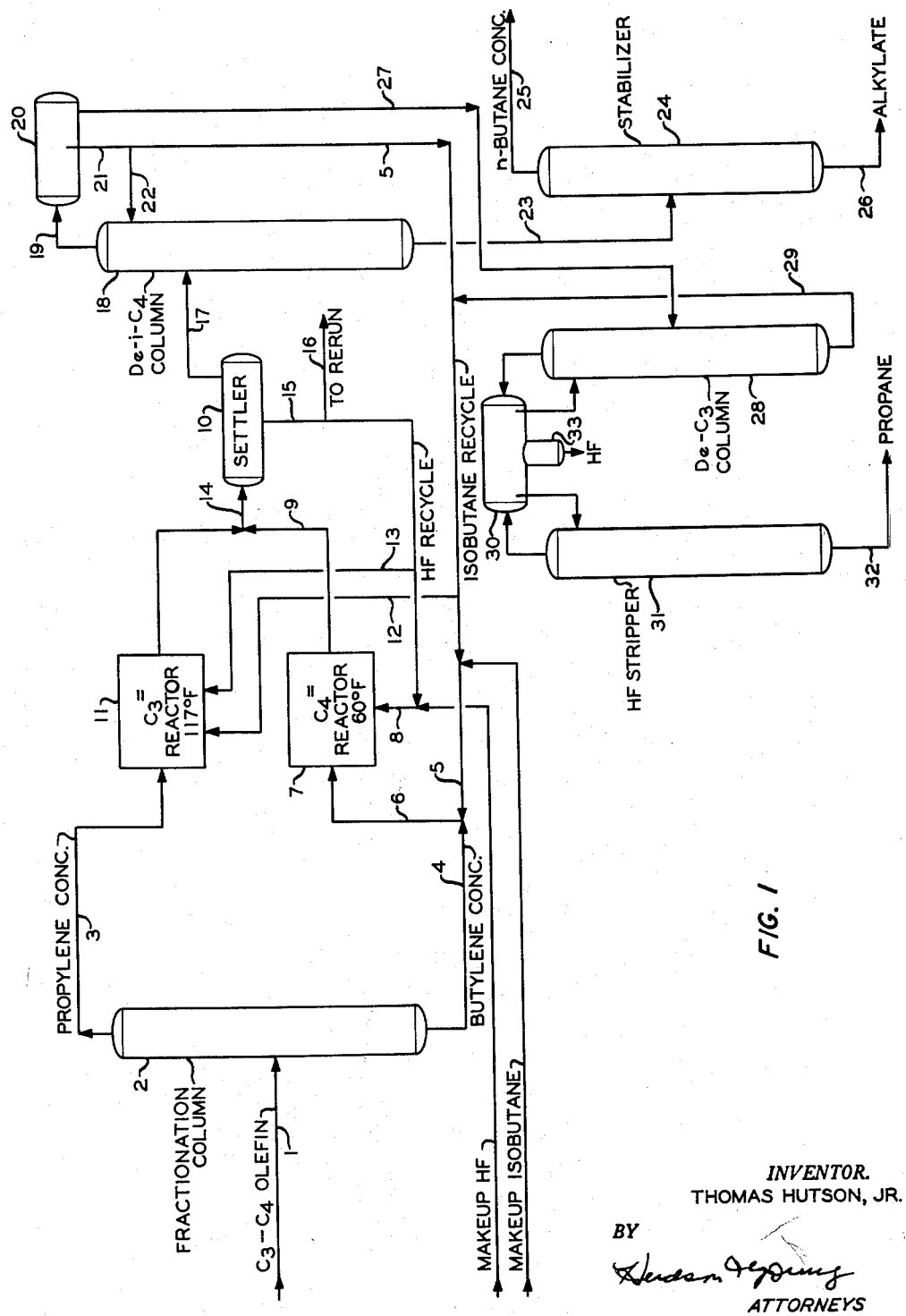

Dec. 10, 1963 T. HUTSON, JR 3,113,987
ALKYLATION
Filed June 27, 1960 2 Sheets-Sheet 1

INVENTOR.
THOMAS HUTSON, JR.
BY
ATTORNEYS

Dec. 10, 1963

T. HUTSON, JR 3,113,987

ALKYLATION

Filed June 27, 1960

2 Sheets-Sheet 2

INVENTOR.
THOMAS HUTSON, JR.
BY
ATTORNEYS

United States Patent Office 3,113,987
Patented Dec. 10, 1963

3,113,987
ALKYLATION
Thomas Hutson, Jr., Bartlesville, Okla., assignor to Phillips Petroleum Company, a corporation of Delaware
Filed June 27, 1960, Ser. No. 38,918
6 Claims. (Cl. 260—683.48)

This invention relates to alkylation. In one of its aspects, the invention relates to the alkylation of an alkylatable compound with each of at least two olefins by passing said compound and one of said olefins into an alkylation zone in which alkylation ensues in the presence of a liquid alkylation catalyst at a temperature at which the last-mentioned olefin is optimally alkylated and wherein the other of said olefins is passed into an alkylation zone together with a further quantity of said isoparaffin and therein alkylated in the presence of a further quantity of said alkylation catalyst at a temperature at which the last-mentioned olefin is optimally alkylated and wherein the contents of said alkylation zones are combined after completion of the respective alkylations and alkylation catalyst separated from the combined effluents, a portion of the catalyst being returned for reuse in each of said alkylation zones while the combined alkylate from which the acid has been separated is fractionated in a common fractionation zone. In another of its aspects, the invention, in one embodiment, separately alkylates isobutane in one zone with a butylene and in another zone with propylene at temperatures at which said olefins optimally alkylate isobutane, the liquid alkylation catalyst comprising essentially hydrofluoric acid alkylation catalyst or its equivalent. In a still further aspect, the invention relates to a method of converting an existing alkylation unit or system having but one alkylation zone into a system which will produce improved product by simply adding to said system one more alkylation zone and utilizing the existing catalyst settling zone and fractionation zone for separating the alkylation effluents from acid and fractionating the alkylate thus produced. In a further aspect of the invention, it relates to reducing the separating time required in an alkylation in which at least two alkylations are separately conducted at different temperatures in the presence of a liquid catalyst, which is separated from the alkylate produced by settling or an equivalent operation, by admixing the second alkylation effluent obtained prior to the separation operation.

The alkylation of an isoparaffin with one or more olefins in a single alkylation zone, using various acidic catalysts, for example, HF, is conventional in the art. Where mixed olefins are reacted in a single alkylation zone, advantage cannot be taken of different optimum temperatures and other conditions for the individual olefins present. Of course, a mixture of olefins could be fractionated into its constituents, and these constituents run consecutively through the alkylation plant, or run through separate complete plants. However, these procedures, while solving the problem of controlling optimum alkylation conditions, introduce other problems of scheduling and expense of equipment. Thus, it is old in the art to separately alkylate different olefins and, when this has been done, it has been the standard practice to provide separate settlers for each alkylation zone.

It has now occurred to me that there is really no need to continue to provide a separate alkylation effluent acid settler or separation zone or, for that matter, any further separate equipment and that only the alkylation reaction zone need be kept separate for each of the different olefinic feeds. That is, the rest of the equipment, namely, the acid settler, HF purification equipment, product purification towers, etc., can be used in common. Thus, except for an olefin fractionating facility and multiple alkylation reactors, the existing or conventional plant equipment can be used. By so operating, the quality and yield of alkylate is increased at only a slight increase in the cost of equipment or in the cost of altering existing equipment.

Further, it is noted that the combination of the two streams of alkylate reduces the temperature of the higher temperature obtained alkylate, thus improving the settling rate or separation of the acid catalyst used.

It will be obvious to one skilled in the art in possession of this disclosure that the modus operandi and/or processes disclosed can be applied to alkylations other than those specifically set forth in the description here made.

It is an object of this invention to provide an alkylation process. It is a further object of this invention to provide an improved alkylation process or method using existing equipment so modified that optimal alkylation of different olefinic materials can be practiced in the presence of a liquid alkylation catalyst. It is a further object of this invention to provide a process for the alkylation of an isoparaffin with at least two separate and different olefinic stocks at temperatures which are best suited for each of said stocks, the alkylations being effected simultaneously in conventional equipment which has been altered only to an irreducible extent. A still further object of the invention is to alkylate, say, isobutane with a butylene, isobutane with amylenes and isobutane with propylene in the presence of hydrofluoric acid in a manner such that each of the olefins will optimally alkylate isobutane and to accomplish these results by providing to existing equipment or to an existing system an irreducible additional amount of equipment. Another object of the invention is to provide more rapid separation of liquid catalyst from alkylation effluents with consequent savings of the amount of equipment required for subsequent treatment. A further object is to provide a modus operandi in which catalyst carry-over from the separation step is reduced, thus reducing the extent of treatment required to obtain a final desired product alkylate.

Other aspects, objects and the several advantages of this invention are apparent from a study of this disclosure, the drawing and the appended claims.

According to this invention, there is provided a process for the alkylation of a compound alkylatable with an olefin which comprises separating a mixture of olefins into at least one olefin which will alkylate said compound optimally at a first temperature in the presence of a liquid catalyst and into another olefin which will alkylate said compound optimally at a second different temperature in the presence of said catalyst, preparing a first alkylation feed comprising said one olefin and said compound and subjecting said first feed in a first zone to alkylation conditions including said first temperature, preparing a second alkylation feed comprising said another olefin and said compound and subjecting said second feed in a second zone to alkylation conditions including said second different temperature, obtaining and removing from said first and second zones, respectively, alkylate containing effluent also containing said liquid catalyst, passing said effluent to a common liquid catalyst separating zone, separating liquid catalyst from said combined effluents in said separating zone, returning at least a portion of said catalyst to each of said first and second zones and recovering a combined alkylate from said separating zone.

Figure 2:
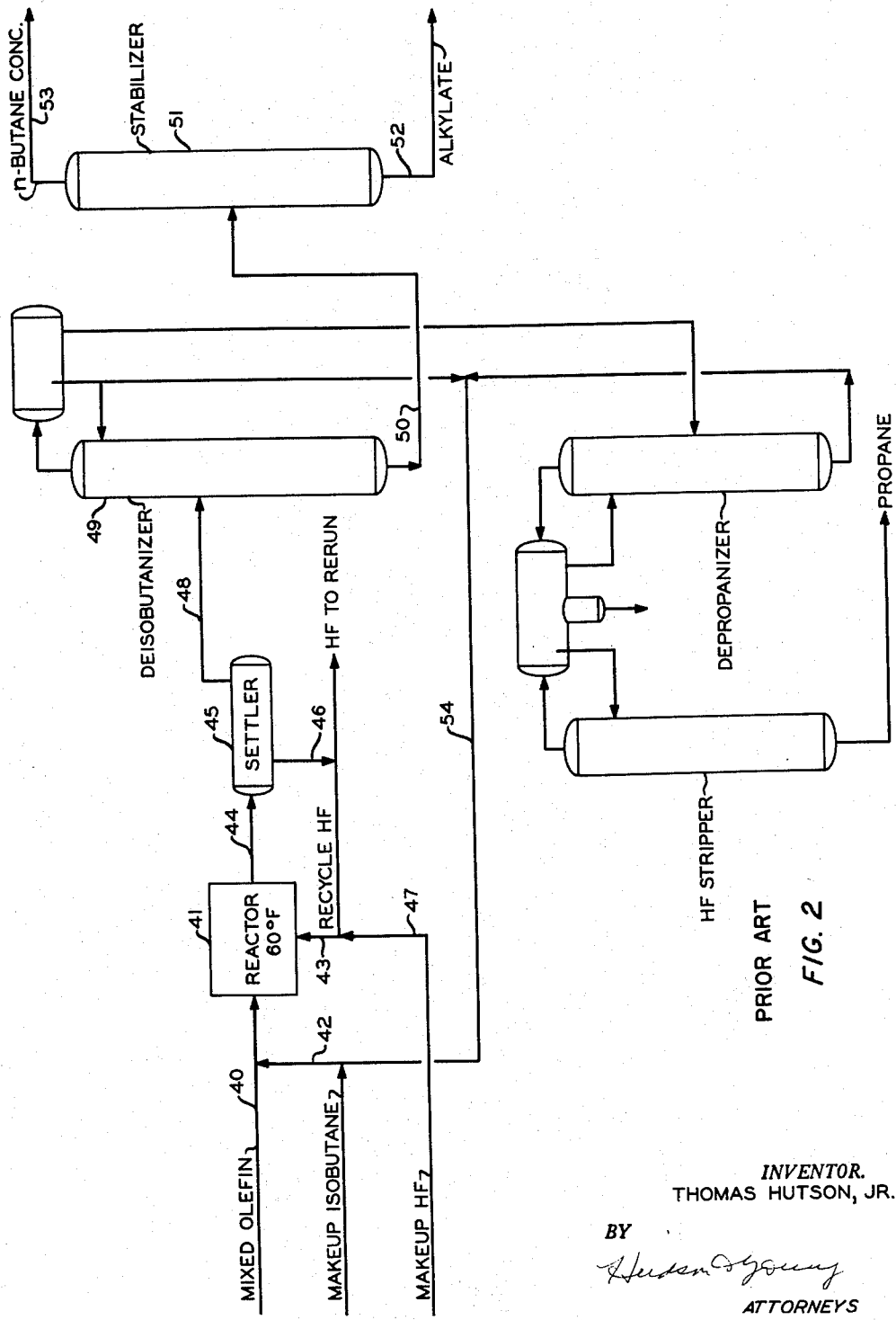

Referring now to the drawing, FIGURE 1 shows separate alkylation of propylene and butylenes according to the invention. FIGURE 2 shows alkylation of a $C_3$–$C_4$ olefin feed, i.e., a mixed olefin feed. FIGURE 2 depicts a conventional operation here included for purposes of comparison.

Referring now to FIGURE 1, according to the invention, a $C_3$–$C_4$ olefin feed, that is, a feed containing propylene and butylenes, is passed by 1 to column 2 wherein propylene and butylene are separated into a propylene concentrate stream 3 taken overhead and a butylene concentrate 4 removed at the foot of the column. Stream 4 is combined with a stream of isobutane recycle in 5 and passed by 6 to butylene reactor 7 which is maintained at about 60° F. and wherein the isobutane and butylene undergo alkylation in the presence of HF catalyst which enters by 8. Alkylation effluent and acid pass by way of pipe 9 to settler 10. Propylene concentrate is passed into reactor 11 in which it is alkylated with isobutane also passed into reactor 11 by way of 12 using catalyst which is passed to reactor 11 by way of 13. Effluent from reactor 11 passes by 14 to settler 10. In the settler, acid is settled from the combined effluents and removed therefrom by way of 15 and passed to 8 and 13 and ultimately by way of 8 and 13 to reactors 7 and 11. When desired, a portion of used acid is taken off at 16 and passed to rerun according to practices known in the art. Alkylate is passed by way of 17 to deisobutanizer column 18 which is operated as will be understood by those skilled in this art. The operation of this column does not form a part of this invention. Isobutane is taken overhead by way of 19 and accumulator 20 and a portion thereof is passed by pipe 21 and pipe 22 to the column as reflux, the remainder passing by way of pipe 5 and pipes 6 and 12 to reactors 7 and 11, respectively, as already described. Bottoms from column 18 constitute largely alkylate and normal butane and are passed by pipe 23 to stabilizer 24 from which a normal butane concentrate is obtained at 25 and the alkylate removed at 26. A stream containing propane and HF is passed by pipe 27 to depropanizer column 28 from which some isobutane is removed at 29 and passed into pipe 5 for reuse, as already described. Overhead from column 28 passes by way of accumulator 30 to HF stripper 31 from the bottom of which propane is recovered at 32. HF is recovered at 33 at the foot of the accumulator. This HF can be reused, as desired.

Referring now to FIGURE 2, it is at once seen that only one reactor is provided and that, therefore, the olefin feed which is necessarily mixed is passed directly by way of pipe 40 to reactor 41, together with isobutane supplied at 42 and alkylation acid catalyst supplied at 43. Alkylation effluent, including the acid, passes by 44 to settler 45 from which settled acid is recycled by way of 46 and 43, together with make-up HF, as known in the art, supplied at 47. The hydrocarbon phase passes by 48 to deisobutanizer 49 from which alkylate and normal butane passes by 50 to stabilizer 51 from the bottom of which stabilized alkylate is removed at 52 and a normal butane concentrate is removed overhead at 53. Overhead from the deisobutanizer is essentially processed as described in connection with FIGURE 1 and isobutane is passed by way of 54 to pipe 42 for reuse.

The individual alkylations which are embodied according to the concept of this invention into the combination of steps which constitute the invention are not considered to be a part of this invention, except as included in said combination. Thus, the conditions of operation in the several reactors of FIGURE 1 are already known.

Generally, the ratio of isoparaffin to olefin will lie in the range of about 4 to about 25 and preferably will be in the operation of this invention about 12. To obtain a composite of alkylate which is now preferred according to the invention, it is preferred according to the invention that about 10 to 60 percent of the olefins used be propylene and the remainder be butylenes. Accordingly, in modifying existing equipment, the added reactor will be chosen bearing this in mind. Depending upon overall throughput, the chosen reactor will either be the smaller or the larger in the case of two olefins, as the case may be.

The catalyst is also well known in the art. Generally, the catalyst now preferred will be 90–92 percent by weight HF, with a water content not to exceed more than about 0.5 percent and an acid soluble oil content not to substantially leave the range 0.1–1 percent, the remainder being dissolved hydrocarbons. The HF recycle rate will be in the approximate range of .25 to 5 or so volumes of HF per volume of hydrocarbon.

The reaction time will be governed by the nature of the equipment used. In general, this time of reaction will be in the range of 20 seconds to 40 seconds to 5 to 20 minutes, depending upon the type of alkylation reactor employed.

*Example 1*

A run was made according to the invention in an array of apparatus as shown in FIGURE 1. The constitution of the streams shown in FIGURE 1, and the properties of the alkylate obtained are as follows:

|  | (1) Olefin Feed, Wt. Percent | (3) Propylene Conc., Wt. Percent | (4) Butylene Conc., Wt. Percent | Make-up Isobutane, Wt. Percent | Make-up HF, Wt. Percent | (5) Isobutane Recycle, Wt. Percent | (15) HF Recycle, Wt. Percent | (32) Propane, Mol Percent | (25) n-butane Conc., Wt. Percent |
|---|---|---|---|---|---|---|---|---|---|
| $C_3$ | 10.6 | 22.5 | 6.9 | 0.1 |  | 2.5 |  | 90.5 | 0.2 |
| $C_3^=$ | 18.1 | 77.0 |  |  |  |  |  |  |  |
| $IC_4$ | 25.1 | 0.5 | 32.8 | 97.0 |  | 91.5 |  | 9.4 | 50.0 |
| $nC_4$ | 15.1 |  | 19.7 | 2.9 |  | 6.0 |  | 0.1 | 49.5 |
| $IC_4^=$ | 15.7 |  | 20.6 |  |  |  |  |  |  |
| $TBu-2$ | 9.2 |  | 12.0 |  |  |  |  |  |  |
| $CBu-2$ | 6.0 |  | 7.8 |  |  |  |  |  |  |
| $2MBu-2$ | 0.1 |  | 0.1 |  |  |  |  |  |  |
| $IC_5$ | 0.1 |  | 0.1 |  |  |  |  |  | 0.3 |
| HF |  |  |  |  | 97.0 |  | 90.5 |  |  |
|  | 100.0 | 100.0 | 100.0 | 100.0 |  | 100.0 |  | 100.0 | 100.0 |
| Olefins | (48.6) | (77.0) | (40.5) |  |  |  |  |  |  |
| Lb./Hr. | 7.31 | 1.72 | 5.59 | 3.91 | 0.7 | 43.7 | 182 | 1.59 | 2.23 |

| | (26) Alkylate |
|---|---|
| API Gravity | 70.2 |
| Reid Vapor Pressure, p.s.i. | 4.0 |
| Initial Boiling Point, °F. | 120 |
| 10% | 185 |
| 50% | 222 |
| 90% | 289 |
| End Point | 430 |
| Research Octane No. and 3 TEL | 105.5 |
| Motor Octane No. and 3 TEL | 107.0 |
| Lb./Hr. | 7.40 |

Alkylate/Olefin (volume) = 1.73.

Example II

For comparison, an alkylation was made with mixed olefins in a single reactor, in apparatus depicted in FIGURE 2. The constitution of the streams shown in FIGURE 2, and the properties of the alkylate obtained are as follows:

|  | (40) Olefin Feed, Wt. Percent | Make-up Isobutane, Wt. Percent | (42) Isobutane Recycle, Wt. Percent | (47) Make-up HF, Wt. Percent | DeC$_3$ BTMS, Mol Percent | (53) n-butane Conc., Wt. Percent | Propane, Mol Percent | (46) Recycle HF, Wt. Percent |
|---|---|---|---|---|---|---|---|---|
| C$_3$ | 10.6 | 0.1 | 2.3 |  | 0.5 | 0.3 | 97.4 |  |
| C$_3^=$ | 18.1 |  |  |  |  |  |  |  |
| IC$_4$ | 25.1 | 97.0 | 89.9 |  | 91.5 | 65.3 | 2.5 |  |
| nC$_4$ | 15.1 | 2.9 | 7.7 |  | 7.8 | 34.1 | 0.1 |  |
| IC$_4^=$ | 15.7 |  |  |  |  |  |  |  |
| TBu-2 | 9.2 |  |  |  |  |  |  |  |
| CBu-2 | 6.0 |  |  |  |  |  |  |  |
| 2MBu-2 | 0.1 |  |  |  |  |  |  |  |
| IC$_5$ | 0.1 |  | 0.1 |  | 0.2 | 0.3 |  |  |
| HF |  |  |  | 97.0 |  |  |  | 91.6 |
|  | 100.0 | 100.0 | 100.0 |  | 100.0 | 100.0 | 100.0 |  |
| Lb./Hr | 7.31 | 4.58 | 44.5 | 0.67 |  | 3.44 | 1.09 | 182 |

|  | (52) Alkylate |
|---|---|
| API Gravity | 68.6 |
| Reid Vapor Pressure, p.s.i. | 3.43 |
| Initial Boiling Point, °F | 135 |
| 10% | 187 |
| 50% | 222 |
| 90% | 323 |
| End Point | 438 |
| Research Octane No. and 3 TEL | 102.9 |
| Motor Octane No. and 3 TEL | 105.0 |
| Lb./Hr | 7.36 |

Alkylate/Olefin (volume) = 1.69.

By comparison of Example I with Example II, it will be seen that the method of the invention produces an increase in the "Research Octane No." of 2.6 and an increase in "Motor Octane No." of 2.0, together with small increases in "API Gravity," "Reid Vapor Pressure" and yield. Very little additional plant equipment is required to obtain these advantages.

Although in the example, essentially the olefin and isoparaffin there shown have been alkylated, it is within the scope of the invention to adapt it to other feeds. Such feeds advantageously can include amylenes and/or isopentanes or isopentane can be alkylated with various amylenes. Other operations will be evident to one skilled in the art in possession of this disclosure when he has studied the same.

Although the invention is now preferred to be operated using catalyst as earlier set forth and defined, boron fluoride containing catalyst or a catalyst consisting essentially of liquid phase BF$_3$ are within the scope of the invention, as may be other catalysts as these are or may become available, it being obvious that the invention is in the combination of steps as set forth in one or more claims and not in the catalyst employed. Thus, sulfuric acid might well be used provided suitable changes appropriate to this catalyst, which one skilled in the art will understand having read this disclosure, are made. Similarly, the alumnium chloride complex can be adapted but is not now preferred.

When alkylating an isoparaffin, a somewhat higher ratio of isoparaffin to olefin can be employed to advantage. Temperature ranges for the various olefins as these can be alkylated using the present invention are as follow:

Propylene—100° to 150° F.; preferred 110° to 130° F.
Butylenes—40° to 90° F.; preferred 50° to 60° F.
Amylenes—25° to 75° F.; preferred 40° to 50° F.

Reasonable variation and modification are possible within the scope of the foregoing disclosure, the drawing and the appended claims to the invention, the essence of which is that, by providing a separate reactor for separate alkylation of olefins in an existing system, alkylation with a common liquid alkylation catalyst can be effected using the existing acid separation and alkylate fractionation and recovery zone.

I claim:

1. A process for the alkylation of a compound alkylatable with an olefin which comprises separating a mixture of olefins into at least one olefin which will alkylate said compound optimally at a first temperature in the presence of a liquid catalyst and into another olefin which will alkylate said compound optimally at a second different temperature in the presence of said catalyst, preparing a first alkylation feed comprising said one olefin and said compound and subjecting said first feed in a first zone to alkylation conditions including said first temperature, preparing a second alkylation feed comprising said another olefin and said compound and subjecting said second feed separately and apart from said first feed and alkylate resulting therefrom in a second zone to alkylation conditions including said second different temperature, obtaining and removing from said first and second zones, respectively, the several alkylate containing effluents also containing said liquid catalyst, passing said effluents to a common liquid catalyst separating zone, separating liquid catalyst from said combined effluents in said separating zone, returning at least a portion of said catalyst to each of said first and second zones and recovering a combined alkylate from said separating zone.

2. A process according to claim 1 wherein said compound is isobutane.

3. A process for the alkylation of an isoparaffin with each of a butylene and propylene in the presence of a liquid alkylation catalyst which comprises subjecting in a first zone an alkylation feed of isoparaffin and a butylene to alkylation conditions including a temperature at which a butylene optimally alkylates said isoparaffin and said catalyst, subjecting in a second zone another alkylation feed of isoparaffin and propylene separately and apart from said feed of isoparaffin and butylene and alkylate resulting therefrom to alkylation conditions including a temperature at which propylene optimally alkylates said isoparaffin and said catalyst, passing the several alkylation effluents containing said catalyst from said first and second zones to a common liquid catalyst separation zone, separating liquid catalyst from said effluents in said zone, returning at least a portion of said catalyst to each of said first and second zones and recovering a combined alkylate from said separating zone.

4. A process according to claim 3 wherein the isoparaffin is isobutane.

5. A process according to claim 3 wherein the temperature at which the propylene containing feed is alkylated in the presence of said catalyst is of the order of 125° F. and the temperature at which said butylene is alkylated is of the order of about 60° F. and the liquid catalyst is hydrofluoric acid.

6. A method of increasing the octane number obtainable with a single alkylation zone containing system which comprises providing an additional alkylation zone in said system, fractionating an olefinic feed into at least one olefin which will alkylate optimally an isoparaffin at a first temperature in the presence of a liquid catalyst and into at least one other olefin which will alkylate said isoparaffin optimally at a second different temperature in presence of said catalyst, preparing a first alkylation feed comprising said one olefin and said isoparaffin and subjecting said first feed in a first zone to alkylation conditions including said first temperature and said catalyst, preparing a second alkylation feed comprising said other olefin and said isoparaffin and subjecting said second feed in a second zone separately and apart from any of said one olefin and said isoparaffin and alkylate resulting therefrom to alkylation conditions including said second different temperature and said catalyst, obtaining and recovering several alkylate containing effluents also containing said catalyst from said first and second zones, passing said effluents to a common liquid catalyst separating zone, separating liquid catalyst from said combined effluents in said separating zone, returning at least a portion of said catalyst to each of said first and second zones and recovering a combined alkylation effluent from said separating zone.

References Cited in the file of this patent
UNITED STATES PATENTS

| | | |
|---|---|---|
| 2,356,374 | Blount | Aug. 22, 1944 |
| 2,415,717 | Watkins et al. | Feb. 11, 1947 |
| 2,417,251 | Hemminger | Mar. 11, 1947 |
| 2,438,852 | Goldsby et al. | Mar. 30, 1948 |
| 2,476,750 | Matuszak | July 19, 1949 |
| 2,820,073 | Dixon et al. | Jan. 14, 1958 |